(12) United States Patent
Burk et al.

(10) Patent No.: US 12,241,725 B2
(45) Date of Patent: Mar. 4, 2025

(54) CONTROL METHOD FOR A MISSILE RADAR SENSOR OF A MISSILE, MISSILE CONTROL UNIT AND MISSILE

(71) Applicant: Diehl Defence GmbH & Co. KG, Ueberlingen (DE)

(72) Inventors: Matthias Burk, Roethenbach (DE); Manuel Subatzus, Fuerth (DE); Volker Koch, Rueckersdorf (DE); Martin Hackel, Ueberlingen (DE); Philipp Braunbarth, Nuremberg (DE)

(73) Assignee: Diehl Defence GmbH & Co. KG, Überlingen (DE)

( * ) Notice: Subject to any disclaimer, the term of this patent is extended or adjusted under 35 U.S.C. 154(b) by 1017 days.

(21) Appl. No.: 17/176,238

(22) Filed: Feb. 16, 2021

(65) Prior Publication Data
US 2021/0262764 A1  Aug. 26, 2021

(30) Foreign Application Priority Data
Feb. 21, 2020 (DE) .......... 102020001155.1

(51) Int. Cl.
*F41G 7/22* (2006.01)
*G01S 13/88* (2006.01)

(52) U.S. Cl.
CPC ......... *F41G 7/2286* (2013.01); *F41G 7/2246* (2013.01); *G01S 13/883* (2013.01)

(58) Field of Classification Search
CPC ..... F41G 7/2286; F41G 7/2246; G01S 13/883
See application file for complete search history.

(56) References Cited

U.S. PATENT DOCUMENTS

| | | | |
|---|---|---|---|
| 5,473,331 A | 12/1995 | Kennedy et al. | |
| 5,629,705 A | 5/1997 | Spettel et al. | |
| 6,806,823 B1 | 10/2004 | Smith et al. | |
| 6,965,342 B2 | 11/2005 | Klausing et al. | |
| 7,741,991 B1 * | 6/2010 | MacBean | H01Q 3/08 |
| | | | 342/146 |
| 8,698,058 B1 | 4/2014 | Lapat | |
| 9,335,127 B1 | 5/2016 | Boka et al. | |
| 9,683,814 B2 | 6/2017 | Dryer | |
| 2016/0223642 A1 | 8/2016 | Moore et al. | |
| 2017/0214134 A1 | 7/2017 | Stratis et al. | |

(Continued)

FOREIGN PATENT DOCUMENTS

| | | | |
|---|---|---|---|
| DE | 69515790 T2 | 11/2000 | |
| EP | 2957854 A1 * | 12/2015 | ............ F41G 7/008 |
| EP | 3221921 A1 | 9/2017 | |

(Continued)

OTHER PUBLICATIONS

Paul Zarchan, "Trajectory Shaping Guidence", 2007, Tactical and Strategic Missile Guidance, 5th Edition, ISBN-10: 1-56347-874-9, Chapter 25.

*Primary Examiner* — Matthew M Barker
(74) *Attorney, Agent, or Firm* — Laurence A. Greenberg; Werner H. Stemer; Ralph E. Locher

(57) ABSTRACT

A method for controlling at least one missile radar sensor moving along a trajectory with a missile. The missile radar sensor is set up to recognize a target object. The operating parameters for modulation of the missile radar sensor are adaptively adjusted during the movement along the trajectory depending on target object data on the target object.

13 Claims, 3 Drawing Sheets

(56) References Cited

U.S. PATENT DOCUMENTS

2017/0301991 A1* 10/2017 Stratis .................... H01Q 1/42

FOREIGN PATENT DOCUMENTS

| EP | 3428676 | A1 | | 1/2019 | | |
|----|---------|----|---|--------|---|---|
| GB | 2327000 | A | * | 1/1999 | ............. | G01S 13/24 |
| GB | 2517650 | A | * | 3/2015 | ........... | G01S 13/522 |
| WO | 02088770 | A2 | | 11/2002 | | |

* cited by examiner

CONTROL METHOD FOR A MISSILE RADAR SENSOR OF A MISSILE, MISSILE CONTROL UNIT AND MISSILE

CROSS-REFERENCE TO RELATED APPLICATION

This application claims the priority, under 35 U.S.C. § 119, of German patent application DE 10 2020 001 155.1, filed Feb. 21, 2020; the prior application is herewith incorporated by reference in its entirety.

BACKGROUND OF THE INVENTION

Field of the Invention

The underlying invention relates to a control method for at least one missile radar sensor moved along a trajectory with a missile, in particular a guided missile, a missile control unit and a missile, in particular a guided missile.

Weapons guidance systems which use radar sensors to guide a weapon to a target are known in the prior art, for example. A weapons guidance system of this kind is known from German utility model DE 695 15 790 T2 (corresponding to U.S. Pat. No. 5,473,331), for example, according to which a firing platform is equipped with a radar device having a synthetic aperture. By means of the radar device of the firing platform, the area surrounding a target can be mapped and the location of the target determined from the mapping. Based on the target location determined by the radar device of the firing platform, the weapon is flown to the target.

A method is known from published, non-prosecuted German patent application DE 31 45 374 A1 with which ground targets can be attacked by a missile. The missile has a mid-phase and end-phase seeker head, wherein with a radar seeker head in the mid-phase, multiple targets are coordinated and, through target selection, an incoming trajectory for the end phase is determined. he radar seeker works on the synthetic aperture principle, wherein in the mid-phase areas transverse to the flight direction are scanned and individual points of the scanned area are resolved based on the Doppler history.

A method for the recognition and identification of objects in the case of missiles is known from international patent disclosure WO 02/088770 A2, corresponding to U.S. Pat. No. 6,965,342. The method involves the environment of the missile being scanned by a radar device, wherein the radar device contains a plurality of antenna elements which are attached along the curved missile contour of the missile tip.

Although the methods known in the art allow target control in the case of a missile, it is nevertheless desirable for the accuracy of the target navigation and target guidance and also the accuracy of the target identification to be improved.

BRIEF SUMMARY OF THE INVENTION

On this basis, a problem addressed by the invention is that of providing a control method for at least one missile radar sensor moved along a trajectory with a missile, one missile control unit and one missile, in particular a guided missile, to be provided which allow improved target control and/or target identification. In addition, providing a control method, a missile control unit and a missile which offer advantages in terms of the functionalization of the missile may be regarded as a problem addressed by the invention.

This problem is, in particular, solved by the features of the independent claims. Embodiments of the invention result from the dependent claims and also from the following description of designs and exemplary embodiments.

According to one embodiment, a control method for at least one missile radar sensor moved along a trajectory with a missile is provided. The missile radar sensor moved with the missile is, in particular, an on-board missile radar sensor which is mounted on, or integrated in, the missile for the purpose of target acquisition, for example. The missile may, in particular, be a guided missile.

According to embodiments, the missile may comprise at least one missile radar sensor which is mounted on, or integrated in, a peripheral surface of the missile, preferably in the region of a guidance unit of the missile, or on or in the missile tip. For example, one or multiple radar antennas may be mounted on, or integrated in, the peripheral surface, for example on or in a cylindrical missile segment which is substantially concentric to the longitudinal axis.

The guidance unit may be positioned or placed between the missile nose or tip and a drive unit. The guidance unit may comprise one or multiple computing and/or control units for movement and drive control, for target acquisition and/or for target navigation of the missile.

In addition to the missile radar sensor, the missile may comprise one or multiple other sensors set up for target acquisition which can be mounted on, or integrated in, a peripheral surface or in or on the missile tip or missile nose.

The missile radar sensor is set up to recognize a target object based on radar signals. For this purpose, the missile radar sensor may comprise one or multiple transmitting antennas, receiving antennas and/or transmitting receiving antennas. In order to be able to recognize or identify a target object in accordance with radar technology, for example, radar signals transmitted from the missile radar sensor and, following reflection, received at environment objects, in particular the target object, can be evaluated by a suitably set up evaluation unit. In particular, the missile radar sensor is set up to recognize environment data, in particular one or multiple targets, on the basis of radar signals, i.e. radar based, with the aim of recognizing and detecting one or multiple target objects to which the missile is to be navigated or guided.

The control method envisages that the operating parameters for modulation of the missile radar sensor are adaptively adjusted via the target object during movement along the trajectory depending on the target object data. In particular, it may be provided in the case of the control method that during movement of the missile the missile radar sensor is operated at different modulations, wherein the different modulations are set or adjusted adaptively depending on the target object data.

The modulation may, for example, include a time-dependent modulation of the operating parameters on the transmitting and/or receiving side. For example, the transmitting signal may include time-dependent modulation, e.g. of the frequency, wherein operating parameters corresponding to the time-dependent modulation for operation of the missile radar sensor can be assigned according to the time-dependent modulation.

Operation of the missile radar sensor based on the respective operating parameters then leads to a transmitting signal with corresponding modulation. The same applies to operating parameters in relation to the receiving signals.

According to the proposed control method, the operating parameters are adaptively adjusted for modulation of the missile radar sensor, so that the modulation of the missile radar sensor can be adaptively changed accordingly, depending on the changed environment data on the target object. Consequently, the operating parameters for modulation referred to according to the claims denote operating parameters of this kind which lead to an operation of the missile radar sensor with modulation defined or laid down by the operating parameters. If these operating parameters are changed by the adaptive adjustment, the missile radar sensor is operated accordingly with a changed, adaptively adjusted modulation.

The expression "adaptively adjust" should be understood to mean, in particular, that the operating parameters are adjusted or changed in a situational manner, wherein the situational adjustment takes place at least based on information on the target object, i.e. at least based on the target object data. In other words, the expression "adaptively adjust" should in particular be understood to mean that the modulation is adjusted in response to changing target object data. In particular, the modulation of the missile radar sensor can be adjusted when target object data change. A change in the target object data may, for example, relate to the position, speed, distance and/or direction of movement of the target object, in particular relative to the missile. If changes in the target object data are identified, for example due to an on-board missile evaluation unit and/or an external evaluation unit, the operating parameters can be adjusted in response to the changes identified, i.e. adaptively adjusted. Through the adaptive adjustment of the operating parameters, the modulation of the missile radar sensor can be suitably adapted, as a result of which recognition of the target object, or of the target objects, for example, and in particular the process of target object detection by the missile radar sensor, can be synchronized with the current movement situation.

The adaptive adjustment of the operating parameters and an adaptive adjustment of the modulation associated with this may take place synchronously, for example, in particular substantially in real time, with changing circumstances relating to the target object in particular.

According to embodiments, adjustment of the operating parameters furthermore based on information or data relating to the missile and/or the missile radar sensor can take place adaptively to the effect that the modulation is adaptively adjusted depending on changing circumstances on the part of the missile and/or the missile radar sensor. On the missile side and on the part of the missile radar sensor, the position, speed, direction of flight and orientation of the missile, or missile radar sensor, are taken into consideration in this case, for example.

Adaptive adjustment of the operating parameters may, in particular, take place based on one or multiple, in particular predefined, marginal conditions, wherein the detection performance, the signal-to-noise ratio, the target contrast and/or other marginal conditions can be used as the marginal condition. For example, adaptive adjustment of the operating parameters can take place in such a manner that with given environmental conditions in relation to the distance from the target object, for example, the speed etc., the operating parameters are optimized in relation to the respective marginal condition. The optimization may, for example, be set up to allow and to improve the recognition, identification and tracking of the target object in the detection window or the recognition window of the missile radar sensor. Optimization may, for example, involve algorithms, according to which the range gates of the radar detection in relation to the target contrast required in each case and/or with regard to an observation period which is suitable in each case, are adjusted so that an optimal target contrast can be achieved adaptively in each case.

Through the adaptive adjustment of the operating parameters for modulation it is in particular possible, as already mentioned, for the detection characteristics, in particular containing transmitting and/or receiving, of the missile radar sensor to be set in such a manner that the target object can be reliably recognized and tracked. In addition, the jamming resistance of the missile radar sensor can be improved by adaptive adjustment.

It may be provided according to embodiments that the aforementioned operating parameters include transmitting mode parameters of a transmitting unit of the missile radar sensor for transmitting radar signals and/or receive mode parameters of a receiving unit of the missile radar sensor for recognizing the radar signals reflected by the target object, in particular.

The transmitting mode parameters and/or the receive mode parameters in this case may be adaptively adjusted depending on the target object data via the target object and/or the missile data. The receive mode parameters may be scanning parameters for the signal scanning of reflected radar signals, for example, for setting the scanning window and/or the integration frequency, for example. The operating parameters may be adjusted or tracked in such a manner, for example, that target objects in the respective scanning interval, in particular the range gate, can be optimally recognized. In association with this, a suppression of signals, in particular jamming or external signals, may take place outside a scanning interval assigned to the target object, wherein suppression of the jamming or external signals can be achieved through suitable adjustment of the operating parameters in respect of the scanning parameters of the missile radar signal.

According to embodiments, the target object data may comprise data on the position of the target object, the size of the target object, the nature of the target object, the approach speed of the target object, the speed of the target object, the distance of the target object from the missile, the acceleration and/or orientation of the target object, for example the direction of movement of the target object.

The target object data may specify or describe the aforementioned data in absolute terms or, insofar as it is possible, in relative terms relative to corresponding missile data, in each case. For example, the speed of the target object may be taken into account as the absolute speed or as the relative speed in relation to the missile speed.

The operating parameters may, in particular, be adaptively adjusted depending on the aforementioned data on the target object and/or the missile. In relation to the adaptive adjustment, one or multiple of the aforementioned data categories such as, for example, the (relative) speed, the (relative) acceleration, the nature, etc. can be used. The selection and use of respective data categories may be situational in this case, e.g. depending on the flight phase. The data category/categories used to adjust the operating parameters for modulation in each case may vary here. For example, adjustments of the operating parameters may take place successively in time, taking account of different data categories in each case, e.g. with the use of only one data category in each case or taking account of different, in particular overlapping, groups of data categories, for example, when multiple data categories are used, for example.

It is also possible for the data which is available on the target object and/or missile to be weighted differently, wherein the weighting can likewise be adaptive depending on the overall situation created by the target object and the missile. Weighting factors in the case of the weighting may, for example, take account of the estimated or calculated accuracy of the target object data, for example. If, for example, the acceleration of the target object can only be determined using a comparatively large error, the data category in each case can be weighted with a small weighting factor, e.g. zero or a comparatively small value close to zero. Conversely, relatively accurate and reliable data can be weighted with a higher weighting factor, e.g. one or close to one. Data categories which are not relevant to the respective adjustment of the modulation, in particular those that are not to be consulted, can be weighted with a weighting factor of zero to this extent.

Use of the aforementioned data categories allows situational adjustments to the modulation to be made, wherein the kinematic movement and/or encounter situation can be taken into account.

In order to describe the data, a control unit set up to implement the control method, e.g. an on-board missile control unit, may use an on-board missile system coordinates system according to embodiments. In particular, an on-board missile system spherical coordinates system having the customary coordinates radius r, azimuthal angle phi and polar angle theta can be used with a polar axis which runs parallel to the missile axis. The positive polar axis direction, i.e. the polar axis vector pointing in the positive direction, is preferably parallel to the vector which points from the drive-side end of the missile to the missile tip.

According to embodiments, the operating parameters, as already indicated, can furthermore be adaptively adjusted depending on missile data. In this case, the missile data may, for example, be selected from the group containing: position of the missile, speed of the missile, acceleration of the missile, approach speed of the missile to the target object, direction of flight of the missile, type of missile radar sensor, position of the missile radar sensor relative to the missile body, energy store of the missile for operating the missile radar sensor, flight phase of the missile. As already described in conjunction with the target object data, respective data, insofar as possible, can also exist or be determined insofar as possible, also relative to corresponding target object data. As already described in conjunction with the target object data, respective data, insofar as possible, can also exist or be determined relative to corresponding target object data. Analogously to the target object data, the missile data can be selected and combined or weighted in a suitable manner in each case, for example depending on the overall situation. In this case, it is also possible, in particular, for one or multiple items of data to be taken into account based on weighting factors. The selection and weighting can, for example, take place depending on the current flight phase in each case, for example an approach phase to the target object or an interception phase of the missile. With the missile data which can be used in addition to the target object data, it is in particular possible for the target acquisition and tracking to be adjusted even more effectively to the overall kinematic movement situation and encounter situation occurring in each case.

The adaptive adjustment of the operating parameters for modulation of the missile radar sensor takes place according to embodiments, at least in sections along the flight phase or substantially during the entire flight of the missile, preferably continuously, in particular iteratively.

Where the adjustment of the operating parameters for modulation takes place iteratively, it is possible to check, for example, whether the data to be considered in each case on the target object and/or the missile have changed. Where there has been a change in the data which goes beyond a predefined threshold value, for example, the operating parameters for modulation of the missile radar sensor can be adjusted and optimized accordingly. Consequently, particularly when there are relevant changes to the data taken into consideration in each case, the modulation of the missile radar sensor can be adjusted.

A corresponding control method therefore allows an iteratively adaptive adjustment of the operating parameters for modulation taking account of the current movement situation and the anticipated encounter situation. Based on an iteratively adaptive adjustment of the operating parameters for modulation which takes place at least sectionally along the trajectory or substantially during the entire flight phase of the missile, the reliability of the target acquisition and, based on this, the guidance of the missile can be further improved. In particular, an adjustment of the modulation to the movement and encounter situation present in each case which takes place substantially in real time is possible.

According to embodiments, the at least one missile radar sensor is a continuous wave radar sensor, in particular a frequency-modulated continuous wave radar sensor, or a pulse radar sensor. Frequency-modulated continuous wave radar sensors are also known as FMCW radar sensors.

According to embodiments, the center axis, i.e. the central or main axis, of the detection field of the missile radar sensor can be oriented obliquely to the longitudinal axis of the missile. The direction of the center axis of the detection field pointing away from the missile preferably forms an intermediate angle with the direction pointing from the drive-side end of the missile to the missile tip which is smaller than 90 degrees, consequently an acute intermediate angle. In this embodiment, the detection field is not concentric to the missile axis, but laterally oriented in relation to the missile axis. The missile radar sensor is preferably set up in such a manner, for example through suitable orientation of the center axis of the detection field, that the detection field can recognize a section of the front half space of the missile in relation to the missile tip.

Based on the missile data and/or the target object data, according to embodiments the roll angle, the yaw angle and/or the pitch angle of the missile can furthermore be controlled. In particular, the target object data and/or missile data can be evaluated by a corresponding control unit for control of the missile. The control unit may be an integral part of the guidance unit of the missile. Based on the evaluated data, the target guidance or target navigation of the missile can be controlled, in particular adjusted, in such a manner that a point of encounter between the target object and the missile can be achieved with at least sufficient probability. For target guidance or target navigation, in addition to the directional data in the on-board missile coordinates system, corresponding global data on the missile or target object can also be used, e.g. data from a global navigation satellite system, GNSS for short, and/or data from an inertial navigation system of the missile.

It is therefore possible overall for the target object data and/or missile data to be used in two respects: first for setting the operating data for modulation of the missile radar sensor and second for setting the operating data for target guidance and target navigation of the missile.

According to embodiments, within the framework of the adaptive adjustment at least one of the following operating parameters of the missile radar sensor can be adaptively adjusted: pulse rate, intensity, frequency, ramp gradient, ramp length, ramp height, in particular level, wave form. The modulations of the missile radar sensor resulting from this may, particularly with regard to an optimum signal-to-noise ratio (SNR), be optimized with regard to a substantially uniform detection zone and/or with regard to a measuring variable describing the radar signature of the target object for an aspect angle which is present in each case.

According to embodiments, the missile data and/or the target object data can be determined and/or updated based on sensor data from at least one external sensor unit received by the missile, based on data from the missile radar sensor and/or based on sensor data from at least one other on-board missile sensor unit, other than the missile radar sensor, for collecting target object data, in particular in real time. For example, target object data can be determined based on a sensor that is present in the missile tip or nose, for example an optical sensor, an infrared sensor or a radar sensor, and used to determine and/or update the target object data. The sensor in the missile tip can be integrated or mounted in such a manner, for example, that it has a detection field which is concentric to the missile axis.

According to embodiments, it is possible to use missile data and/or target object data which are/have been received by a suitably set-up receiving unit of the missile from an external communication unit, for example via a one-directional or bidirectional data connection. The external communication unit may be, for example, a ground-based, water-based or air-based firing unit for the missile or a ground-based, water-based or air-based weapons system unit assigned to the missile. The data transmitted and received from the external communication unit may, for example, be based on sensor data from a sensor unit assigned to the external communication unit which may be a radar sensor unit, for example. Data may be received from the external communication unit before the firing or launch of the missile and/or during the flight of the missile.

According to embodiments, the sensor data from the external sensor unit can be received at least in part via a wireless connection, e.g. an uplink connection, during the flight of the missile. Before the missile is launched, sensor data from the external sensor unit can be received by the missile, i.e. by a corresponding receiving unit of the missile, by means of a wired data connection or by means of a wireless connection.

Data from the external sensor unit may, in particular, be stored in a storage unit on the missile side and used as required for adaptive adjustment of the operating data for modulation of the missile radar sensor. Consequently, previous knowledge of the target object can easily be supplied to the missile for adjustment of the operating parameters for modulation of the missile radar sensor. In addition, data on the target object and/or missile can also be supplied during the flight substantially in real time.

Alongside the external data, or in addition to it, data determined based on an on-board missile inertial sensor system for missile navigation based on inertial navigation can also be used for adaptive adjustment of the operating data for modulation. In addition, as already mentioned, data from a global navigation system, in particular a global navigation satellite system (GNSS), can be used. Based on additional data of this kind, it is particularly possible for the operating parameters for modulation to be set in a suitable manner and tailored for the respective situation by including the position and overall kinematic situation, with the aim of further improved detection accuracy and reliability of the target acquisition based on the data collected using the missile radar sensor.

According to embodiments, the adaptive adjustment of the operating parameters for modulation of the missile radar sensor can furthermore take place depending on the signal-to-noise ratio (SNR) existing in each case, depending on a detection performance required in each case, in particular in relation to the detection probability and false alarm rate, depending on the antenna gain and/or depending on the transmission power in the direction of the target object, in particular depending on the range of the missile radar sensor. As already indicated earlier, the adaptive adjustment of the operating parameters for modulation of the missile radar sensor can take place in such a manner that one or multiple of the aforementioned variables, i.e. SNR, detection performance, etc., are each optimized situationally. For example, through a suitable ramp configuration in the case of an FMCW radar sensor, an optimized SNR can be achieved in each case and, associated with this, a given detection performance.

According to embodiments, in the case of the control method a time-continuous signal, in particular a frequency-modulated time-continuous signal, with a given period duration—generally also known as the chirp duration—can be set and emitted in an initial flight phase. In this flight phase there is still no adaptive adjustment of the modulation of the missile radar sensor. In a subsequent flight phase following identification of the target object in the evaluation window of the missile radar sensor, based on a detected target echo, for example, and/or in the evaluation window of the other on-board missile sensor unit, the operating parameters for modulation of the missile radar sensor can be adaptively adjusted, in particular as described above, taking account of target object data and/or missile data. Consequently, with embodiments of this kind adaptive adjustment of the operating parameters for modulation of the missile radar sensor begins at the point in time, or in the section of the flight phase, when the missile radar sensor and/or the other sensor unit is/are able to recognize the target object.

In the initial flight phase the operating parameters of the missile radar sensor can be set based on estimated data on the range and/or on the approaching speed to the target object, for example, in particular based on a priori knowledge of the target object and/or missile, wherein the missile radar sensor can be operated in this initial flight phase without changing the modulation, i.e. with constant modulation.

According to embodiments, in a final flight phase, for example in a final interception phase when used with a guided missile, the operating parameters for modulation of the missile radar sensor can be statistically adjusted. In this case, the final phase follows an intermediate flight phase in which the operating parameters for modulation, as suggested in embodiments herein, are adaptively adjusted depending on the target object data and/or missile data. The intermediate flight phase may directly follow the initial flight phase, wherein a transition between the initial and intermediate flight phases can take place at the time or in the region of the flight of the missile, in which the target object is recognized, or can be recognized, using the on-board missile sensor or sensors. The transition from the intermediate flight phase to the final flight phase may take place when a distance, e.g. a predefined distance, is not reached, for example. In addition, it is possible to change over from the intermediate flight phase to the final flight phase as soon as an adequate target contrast is reached or can be guaranteed over fixed target retention times. With this kind of mode of operation of the missile radar sensor, the accuracy and reliability of the target acquisition, and therefore the target guidance, can be improved based on data obtained on the target object and the missile. As soon as statistical methods for setting the modulation are sufficient, they can be used in the final flight phase, as a result of which the system performance for determining or calculating the respective operating parameters can be reduced.

According to embodiments, a missile control unit is provided. The missile control unit contains a fixed-programmed control unit and/or a control unit that can have volatile programming with non-volatile storage assigned, wherein the fixed-programmed control unit and/or the non-volatile storage include instructions, the execution of which by the fixed-programmed control unit or the control unit that can have volatile programming produce a control method containing method steps of a control method according to one of the embodiments described herein.

According to embodiments, a missile, in particular a guided missile, is provided which includes a missile control unit of this kind. The missile control unit may be implemented, at least partially, for example in conjunction with a missile control system of a guidance unit for flight control and navigation of the missile and/or at least partially as a separate control unit in conjunction with the missile radar sensor.

According to embodiments, the missile contains at least one on-board missile radar sensor, wherein the missile control unit is coupled in terms of signals and controls with the on-board missile radar sensor for the actuation thereof according to a control method following one of the embodiments proposed herein.

According to embodiments, the on-board missile radar sensor may have a detection field, the center axis of which is oriented obliquely to the longitudinal axis of the missile, in particular to the front half-space of the missile. According to embodiments, the on-board missile radar sensor may be integrated in, or mounted on, a periphery of the missile body.

According to embodiments, the missile may furthermore include one or multiple other on-board sensor units for recognizing target object data which differ(s) from the missile radar sensor. The other sensor unit(s) may be coupled in terms of signals and controls with the missile control unit for implementing a control method according to one of the embodiments described herein. The other sensor unit may be a radar sensor unit, an optical sensor unit or an infrared sensor unit, for example. The other sensor unit may be integrated in, or mounted on, a missile nose, for example, and have a detection field which is concentric to the missile axis, for example. In the embodiment with a missile radar sensor integrated obliquely to the longitudinal axis of the missile, e.g. on the outer periphery of the missile body, it is particularly possible for further functionalization's which differ from target object recognition to be integrated at the missile tip. However, as was described in connection with embodiments, the control method proposed herein can also be used for target-seeking sensor units which are mounted or integrated in the missile tip. If two or more target-seeking sensor units are used, for example in the missile tip and/or on the periphery of the missile, target identification and target navigation can be substantially improved.

As has already been described in connection with embodiments, the missile radar sensor can be set up in such a manner that the detection field thereof has a center axis, i.e. a central or main axis, which is oblique to the longitudinal axis of the missile. A corresponding missile radar sensor may, in particular, be referred to as a side-scan sensor. A side-scan sensor of this kind may therefore have a sensor unit, the one or multiple sensors whereof each has/have a detection field, the center axis whereof has a polar angle other than zero, in particular an acute polar angle, in the coordinate system of the missile.

The polar angle in this case should be particularly understood in relation to the polar axis defined by the longitudinal axis of the missile, more accurately in relation to a polar axis running parallel to the longitudinal axis direction and the center axis of the sensor field. In this case, the polar angle should be understood to mean the angle that is measured between the polar axis vector pointing from the drive-side end to the head-side end along the polar axis and the central axis vector running along the respective central axis and pointing in the direction of the detection field of the missile.

A corresponding side-scan sensor therefore has a detection field which is non-concentric in relation to the missile axis. The direction of the positive polar axis, i.e. the polar axis vector, can be understood in relation to a right-handed reference system of the missile in spherical coordinates, wherein the direction of the positive polar axis is defined by the direction running from the drive-side end to the head-side end. According to this spherical coordinates system, the polar angle is understood in the aforementioned sense and an associated azimuthal angle should be understood to mean a right-handed angle measured in the circumferential direction to the polar axis vector.

The above comments in relation to the orientation of the detection field with regard to spherical coordinates should apply accordingly to other coordinate systems which differ from spherical coordinates systems, in particular to coordinate systems which are not associated with the missile in a stationary manner.

The term "detection field" should be generally understood in this case and not limited to radar sensors, but should also apply accordingly to infrared sensors, optical sensors or other sensors which are suitable for detecting a target object during implementation.

So that a missile control unit is set up for the implementation and execution of the respective functions described herein, it can be programmed accordingly. The programming in this case may exist as fixed programming on a corresponding control module and/or be present in the form of instructions which are stored in non-volatile storage and which bring about implementation of the respective functions described herein during execution by a computer unit, in particular a processor.

Based on the target object data and missile data, the missile can be maneuvered according to predictive guidance control, for example, in which by way of example, but not exclusively, trajectory shaping guidance as known from: Paul Zarchan, 2007, Tactical and Strategic Missile Guidance, 5th Edition, ISBN-10: 1-56347-874-9, Chapter 25, for example, can be used.

According to embodiments, the missile radar sensor and, in particular, a corresponding missile control unit, can be set up in such a manner that the directional characteristics of the missile radar sensor can be changed, in particular set, in such a manner based at least on target object data and/or missile data that the target object is placed at least sectionally along the trajectory within the detection field of the missile radar sensor and, in particular, can be detected with a sufficient signal-to-noise ratio. With a correspondingly set-up missile control unit or with correspondingly set-up control units, the robustness of the target acquisition and target guidance can, in particular, be improved.

According to embodiments, the missile control unit can be set up to detect or identify a target object placed in the detection field of the missile radar sensor and/or the other sensor unit, in particular the target object as such, the position, orientation and/or speed thereof, based on sensor data from the detecting sensor unit in each case. In addition, the missile control unit or an assigned control unit may be set up, at least in part based on sensor data, possibly including further target object data and/or missile data, to identify a trajectory for the adaptively active, predictive guidance of the missile to the target object. Based on the trajectory, the missile can be guided, i.e. navigated, by the missile control system to the anticipated point of encounter with the target object. Data processing steps for determining, in particular calculating, target object data, missile data and/or data for the flight control of the missile may, at least in part, also be realized by external data processing units, wherein corresponding data can then be transmitted to the missile in a wireless or wired manner via suitably set-up data connections and received therefrom.

The term "adaptive" should be particularly understood in connection with the guidance of the missile and in connection with the adjustment of the operating parameters for modulation to mean that the guidance or adjustment of the operating parameters takes place in response to changing environment situations and conditions, for example changing movement situations.

The term "predictive" should be understood in connection with the guidance of the missile to mean, in particular, that the guidance and associated movement control of the missile takes place in relation to an anticipated point of encounter.

According to embodiments, the missile control unit can be set up, within the framework of adaptively active, predictive guidance, to perform at least one of the following steps, in particular iteratively:

determination of the anticipated point of encounter of the missile with the target object and determination or setting of an angle of encounter of the missile with the target object in such a manner that the detection field contains a direct line of sight to the target object; and determination of the trajectory and/or orientation of the missile, in particular orientation in relation to the roll axis, pitch axis and/or yaw axis of the missile, in such a manner that the target object is at a predefined distance from the limits of the detection field, preferably in such a manner that the target object is placed roughly at the center of the detection field.

The angle of encounter in this case should be understood to mean, in particular, the angle measured between a trajectory of the target object and the trajectory of the missile. Simultaneously with the steps described, the operating parameters for modulation can be adaptively adjusted, in particular in those flight phases in which adaptive adjustment of this kind can be used to improve target acquisition.

It is explicitly stated at this point that functional and/or structural features of embodiments of the missile control system according to the invention and of the missile and method features of embodiments of the control method according to the invention, insofar as they have not already been explicitly described, can, however, also be changed over to the other category in each case and claimed, at least based on the appendices in the patent claims.

The term "in particular" used within the framework of the description of embodiments and variants according to the invention and in the claims should not be understood to be limiting, but (only) to the effect that the features characterized by "in particular" relate to special embodiments or variants, unless otherwise specified.

Other features which are considered as characteristic for the invention are set forth in the appended claims.

Although the invention is illustrated and described herein as embodied in a control method for a missile radar sensor of a missile, a missile control unit and a missile, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
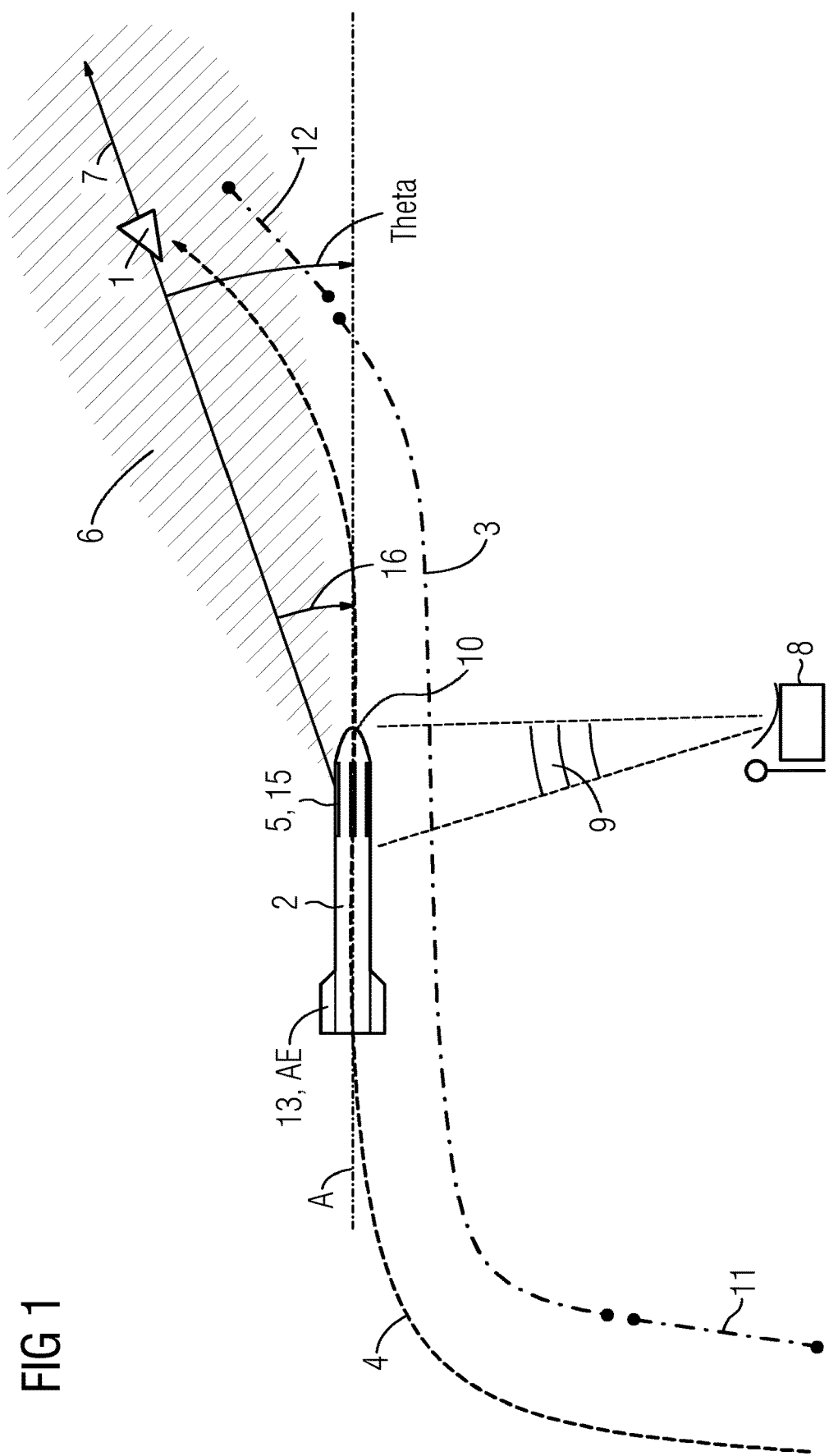
FIG. 1 is an illustration showing by way of example a guided missile navigated to a target object according to the invention.

Referring now to the figures of the drawings in detail and first, particularly to FIG. 1 thereof, there is shown by way of example a guided missile 2 navigated to a ground-based, air based or water-based movable target object 1, which guided missile 2 is located in an intermediate flight phase 3 of the approach to the target object 1 along a trajectory 4 in FIG. 1.

The guided missile 2 contains a missile radar sensor unit with an on-board missile radar sensor 5 and a non-illustrated control and data-processing unit connected to the missile radar sensor in terms of signals and controls for processing and handling sensor data from the missile radar sensor 5 and/or further data and sensor data, for example from on-board or other external sensor units.

In the exemplary embodiment in FIG. 1, the missile radar sensor 5 is configured as a side-scan sensor which has a detection field 6 with a center axis 7 which has an acute polar angle theta with the direction pointing to the missile tip 10. The missile radar sensor 5 is set up for the acquisition of target objects, in particular the target object 1, during movement along the trajectory 4.

Alongside the missile radar sensor 5 provided on the peripheral side, the guidance missile 2 may, in addition, have a target acquisition sensor integrated on the missile tip 10 which is configured and set up to detect the target object 1 or target object data.

The missile radar sensor 5 and a missile control unit connected thereto in terms of signals and controls are set up to adjust the operating parameters for modulation of the missile radar sensor 5 adaptively, depending on data on the target object 1, i.e. depending on target object data and/or data on the missile, i.e. missile data.

For adaptive adjustment of the operating parameters for modulation, data on the target object 1 and guided missile 2 determined by means of the missile radar sensor 5 and/or by means of an external sensor unit 8 can be evaluated to see whether a change in modulation of the missile radar sensor allows improved target acquisition.

If a possibility exists for improving target acquisition, a control unit assigned to the missile radar sensor 5, for example a missile control unit, can adjust the operating parameters adaptively for modulation of the missile radar sensor 5, for example in respect of an im-proved signal-to-noise ratio and/or in respect of an improved false alarm rate and/or detection probability.

The adaptive adjustment of operating parameters for modulation preferably takes place in this case based on the sensor data of the missile radar sensor 5 and, where necessary, having recourse to additional sensor data from the external sensor unit 8 and/or one or multiple other on-board sensor units. In this case, the adaptive adjustment of the operating parameters for modulation can be set up in such a manner that, as has already been described above, optimal SNR's etc. are achieved.

The adaptive adjustment of the operating parameters for modulation preferably takes place at a point in time or at an interval in time during the flight of the missile 2, i.e. in a flight phase in which the missile radar sensor 5 and/or any other sensor units are able to detect the target object 1, as depicted schematically in FIG. 1. In the preceding flight phases in which target acquisition is still not possible, the operating parameters for the missile radar sensor 5, for example according to a predefined modulation based on data on prior knowledge, in particular a priori knowledge, can be set in relation to the target object, wherein the data on prior knowledge can be supplied and received from the external sensor unit 8, for example.

Depending on the flight phase and detection situation, the target object data and/or flight object data can be updated based on the sensor data of the missile radar sensor 5 and/or the other sensor data, and adjustment of the operating parameters for modulation of the missile radar sensor 5 can take place depending on the updated target object data and/or missile data. Consequently, an adjustment of the operating parameters for modulation for improved target acquisition and/or target navigation taking place substantially in real time is possible.

In order to receive data from the external sensor unit 8, the missile control system may have a receiving unit (not shown) which allows at least one unidirectional data transmission 9 of data on the guided missile 2.

Data on the guided missile 2, i.e. missile data, can also be obtained from data determined in connection with an inertial navigation method used for target navigation. In addition, data on the target object, i.e. target object data, can be determined based on sensor data from a sensor unit integrated in the missile tip 10.

The data on the guided missile 2 and target object 1 may be static or dynamic data.

Modulation of the missile radar sensor 5 can be adjusted based on the static and/or dynamic data available on the target object 1 and/or the guided missile 2.

Figure 2:
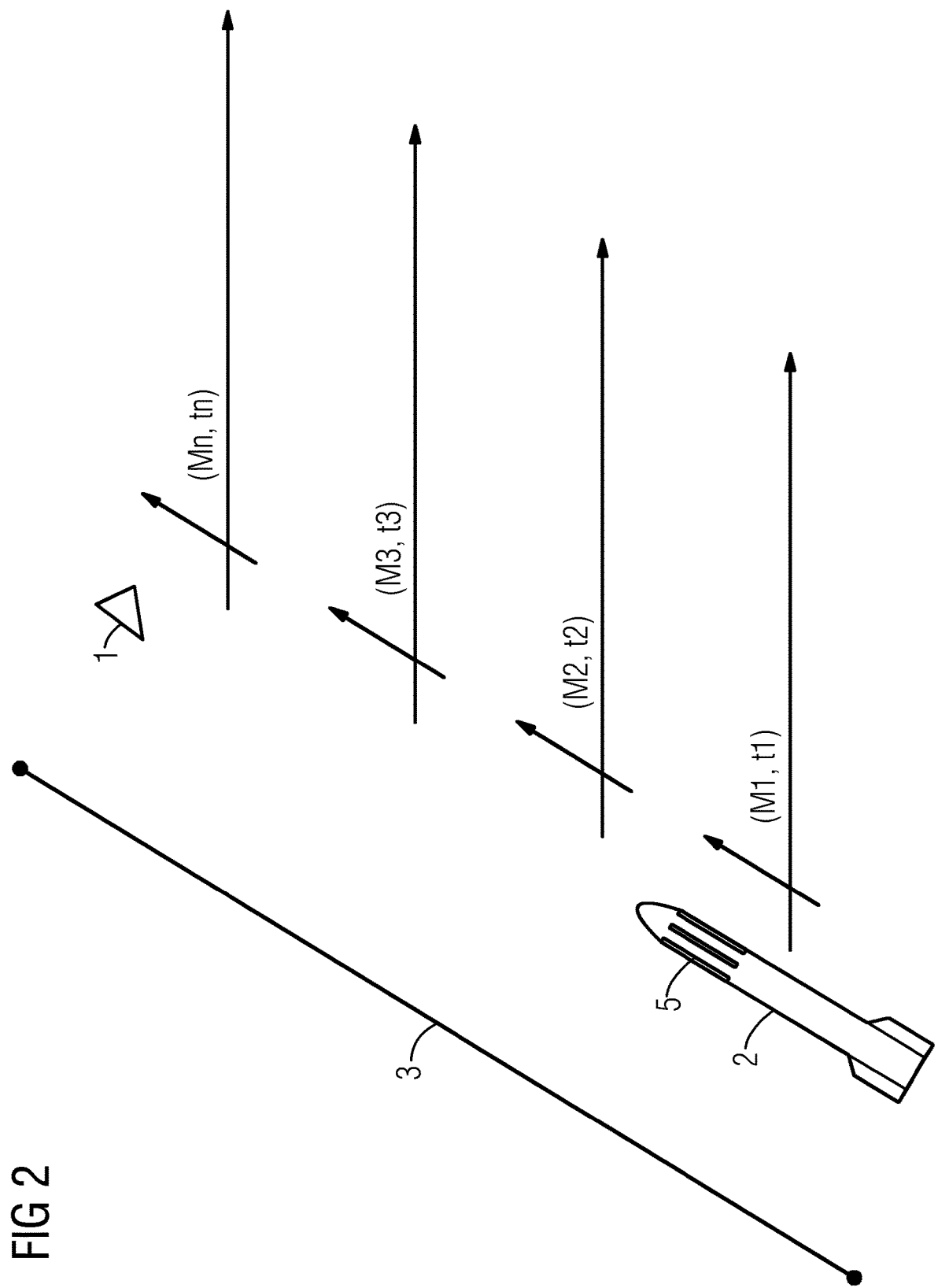
FIG. 2 is an illustration showing schematically a sequence of different modulations in an intermediate flight phase.

This is shown schematically by way of example in FIG. 2, which shows a sequence of different modulations in the intermediate flight phase. During the intermediate flight phase 3, adaptive adjustment of the operating parameters takes place for modulation of the missile radar sensor 5. Adaptive adjustment takes place in this case based on target object data such as size, distance, approach speed, relative speed, etc., in such a manner that the SNR and the detection performance are optimized, in particular. If a changed overall situation, in particular a kinematic overall situation, is determined or established, the associated control unit changes the modulation of the missile radar sensor 5 accordingly, in such a manner that optimal target acquisition is possible, particularly with regard to the SNR and detection performance.

In the example in FIG. 2, multiple iterations for adjustment of the operating parameters for setting the modulation of the missile radar sensor are shown. Following adjustment of a first modulation M1 at time t1 in the intermediate flight phase, a second modulation (M2, t2) and, correspondingly iteratively, a third modulation (M3, t3) and further modulations (Mn, tn) (wherein n is a natural number) are each set adaptively in the described manner.

The initial setting of the modulation may, for example, be set in the firing phase 11 of the missile by a firing unit (not shown) based on missile data and/or target object data which are detected and supplied by the external sensor unit 8.

In the final flight phase 12 (in FIG. 1), insofar as a suitable SNR and an adequate detection performance can be guaranteed, for example, modulation of the missile radar sensor 5 can be statistically adjusted, as a result of which, for example, in the final flight phase 12 the calculation work involved in the target acquisition, target guidance and target navigation can be reduced.

For adaptive adjustment of the operating parameters for modulation of the missile radar sensor 5, target object data such as speed, position, direction of movement of the target object and/or corresponding data of the missile can be used, for example.

The guided missile 2 according to FIG. 1 has a drive 13 which defines a drive-side end AE of the guided missile 2. At the end facing away therefrom in the direction of the longitudinal axis A, the guided missile 2 has a missile head which is integrated in the missile tip 10. At the drive-side end AE, the guided missile 2 has multiple fins for guidance or for flight stabilization which are not referred to in greater detail.

In the direction of the drive-side end AE, the guided missile 2 has a guided part 15 attached to the missile tip 10. The missile tip 10 may have a further sensor unit for target acquisition or be otherwise functionalized, for example with a warhead.

The guided part 15 contains one or multiple missile control units (not shown) for guiding the guided missile 2. In the example in FIG. 1 the missile radar sensor 5 is mounted or integrated on a longitudinal peripheral surface of the guided missile body, which offers the advantage of short signal paths between the sensor units, for example between radar antennas, of the missile radar sensor 5 and an assigned missile control unit and the control units of the guided part 5. In addition, the missile radar sensor 5 mounted or integrated on the peripheral side also offers aerodynamic advantages by comparison with other kinds of assembly on the missile body.

As has already been mentioned, the missile radar sensor 5 has a detection field 6 which is not concentric to the longitudinal axis A.

The detection field 6 can be described by a missile-fixed, right-handed spherical coordinates system, the origin of which lies on a sensor surface of a sensor of the missile radar sensor 5. The spherical coordinates system has a polar axis running parallel to the longitudinal axis A, wherein the direction of the positive polar axis is defined by the direction running from the drive-side end AE to the missile tip 10. A vector running in the positive direction of the polar axis is referred to below and also herein as a polar axis vector.

The detection field 6 in the example shown is substantially concentric to the center axis 7, wherein the vector starting from the coordinate origin, pointing away from the missile body 2 and running through the center axis 7 is referred to below as the center axis vector.

The center axis polar angle 16 defined between the polar axis vector and the center axis vector is an acute, positive angle other than zero in the example shown.

In the coordinate system of the side-scan sensor 2, the position of the target object 10 can be described by a distance from the coordinate origin, a polar angle theta and an azimuthal angle phi.

By means of the missile radar sensor 5, following acquisition of the target object 1, the distance, the polar angle theta and the azimuthal angle phi, and also other parameters such as bearing, position, orientation and/or speed of the target object 1 based on radar signals of the missile radar sensor 5 can be determined. The same applies to other kinds of sensor, such as infrared sensors and optical sensors, which can be integrated in the missile tip 10, for example.

Before and/or also after the launch of the guided missile 2, target object data determined by the external sensor unit 8 can be transmitted to the guided missile 2, in particular in order to update the target object data existing for the guided missile 2, as a result of which the accuracy of the target acquisition and target guidance, in particular, can be improved.

If the orientation of the guided missile 2 in a flight phase should not be suitable for detecting the target object 1 in the detection field 6, the guided missile 2 can be navigated and oriented accordingly, e.g. through suitable setting of the roll, yaw and pitch angle in such a manner that the target object 1 comes to lie in the detonation field 6. In addition, the operating parameters for modulation of the missile radar sensor 5 based on the target object data and/or missile data can be adaptively adjusted in a suitable manner, so that advantageous detection conditions exist.

Once the guided missile 2 has been oriented and aligned in such a manner that the target object 1 is placed in the detection field 6 and can be detected, the target can be guided to the target object 1, at least partially, using the sensor data of the missile radar sensor 5. The missile control system can be set up accordingly for this purpose to track the target object 1 based on the sensor data of the missile radar sensor 5 and to guide the guided missile 2 to the target object 1 predictively, based on an anticipated point of encounter between the guided missile 2 and the target object 1.

Based on the anticipated point of encounter and the kinematic movement and encounter situation existing in each case, the missile control system can adaptively set the orientation of the guided missile 2 and the operating parameters for modulation in such a manner that optimum target acquisition is possible by means of the missile radar sensor 5.

In the final flight phase 12 following the intermediate flight phase 3, the operating parameters can be statistically adjusted for modulation of the missile radar sensor 5, insofar as this is possible in relation to adequate target acquisition, in particular if an adequate tar-get contrast can be achieved over fixed time retention times. Where necessary, it is also possible for an adaptive adjustment of the operating parameters to take place in the final flight phase 12 for modulation of the missile radar sensor 5.

It is evident that with the missile control system described or a corresponding method, efficient target acquisition and target guidance of the guided missile 2 can be achieved.

Figure 3:
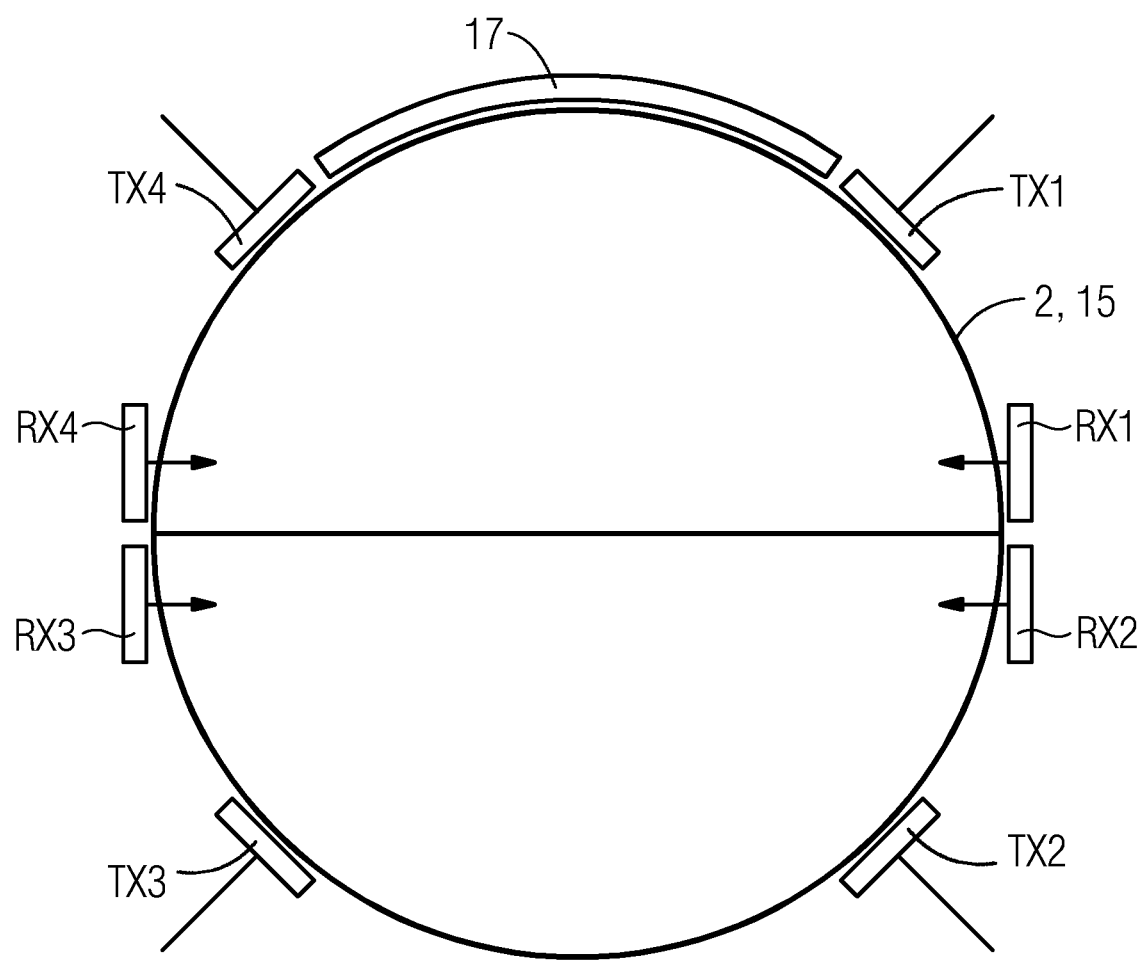
FIG. 3 is an illustration showing schematically a missile radar sensor suitable for implementing the method.

FIG. 3 shows schematically a missile radar sensor 5 suitable for implementing the control method in cross section. As is evident from FIG. 3, the missile radar sensor 5 has radar antennas in the region of the guided part 15 arranged at the periphery thereof. In concrete terms, the missile radar sensor 5 has four transmitting antennas TX1 to TX4 and two pairs of two receiving antennas RX1, RX3 and RX2, RX4 in each case.

The radar antennas TX, RX are arranged distributed on the periphery of the guided part 15, wherein the individual antennas may be designed as surface wave antennas or as substrate integrated leaky wave antennas, for example.

By means of the adaptive adjustment of the modulation of the transmitting antennas TX and/or the receiving antennas RX, the missile radar sensor 5 can be adjusted to the respective encounter and movement situation and optimally set for target acquisition.

Using the four transmitting antennas TX and receiving antennas RX shown and suitable modulations, the front half-space of the guided missile 2 can be comparatively well illuminated, wherein the operating parameters for modulation of the missile radar sensor 5 can, in particular, be adaptively adjusted in such a manner that the center axis 7 is optimally oriented in the direction of the target object 1 and optimal acquisition of the target object 1 is possible.

Using the receiving antennas RX which are arranged on opposite sides of the missile body, reflected radar signals from two opposite space segments can be received and recognized.

Furthermore, an optional GNSS sensor 17 is shown in FIG. 3, with which the guided missile is able to determine positional data which can be used for adaptive adjustment of the operating parameters for modulation.

The control method proposed herein allows, in particular, optimized target acquisition and target guidance, wherein on account of the structure of the missile radar sensor integrated in embodiments on the periphery of the missile body, alternative functionalization's are possible for the missile tip.

REFERENCE NUMBERS 1 target object
2 guided missile
3 intermediate flight phase
4 trajectory
5 missile radar sensor
6 detection field
7 center axis
8 external sensor unit
9 data transmission
10 missile tip
11 firing phase
12 final flight phase
13 drive
14 guided missile head
15 guided part
16 polar angle
17 GNSS sensor
A longitudinal axis
AE drive-side end
M modulation
n natural number;
t time
Theta polar angle
TX transmitting antenna
RX receiving antenna

The invention claimed is:

1. A method for controlling at least one missile radar sensor moving along a trajectory with a missile, which comprises the steps of:

setting up the at least one missile radar sensor to recognize a target object, wherein a center axis of a detection field of the at least one missile radar sensor is oriented obliquely to a longitudinal axis of the missile and towards a forward half-space of the missile and said at least one missile radar sensor is mounted to, or integrated in, a periphery of a body of the missile; and adaptively adjusting operating parameters for modulation of the at least one missile radar sensor during movement along the trajectory for adjusting a target acquisition and tracking to a respectively existing overall kinematic situation depending on target object data on the target object and depending on missile data;

the operating parameters including transmitting mode parameters of a transmitting unit of the at least one missile radar sensor for transmitting radar signals and receive mode parameters of a receiving unit of the at least one missile radar sensor for acquiring radar signals reflected by the target object;

the target object data including data of an approach speed and an orientation of the target object; and the missile data including data of a speed of the missile, a direction of flight of the missile, and a location of the at least one missile radar sensor relative to the body of the missile.

2. The method according to claim 1,
wherein the target object data are additionally selected from the group consisting of: data on a position of the target object, a size of the target object, a nature of the target object, a speed of the target object, and a distance of the target object from the missile; and
adaptively adjusting the operating parameters in dependence on respective target object data.

3. The method according to claim 1, wherein the missile data are additionally selected from the group consisting of: a position of the missile, an acceleration of the missile, an approach speed of the missile to the target object, a type of missile radar sensor, an energy store of the missile for operating the at least one missile radar sensor, and a flight phase of the missile.

4. The method according to claim 3, wherein based on the missile data and/or the target object data, a roll angle, a yaw angle and/or a pitch angle of the missile is/are furthermore controlled.

5. The method according to claim 1, wherein the at least one missile radar sensor is a continuous wave sensor or a pulse radar sensor.

6. The method according to claim 1, wherein within a framework of an adaptive adjustment of the operating parameters for the modulation at least one of the following operating parameters is adaptively adjusted: pulse rate, intensity, frequency, ramp gradient, ramp length, or ramp height.

7. The method according to claim 1, which further comprises determining and updating at least one of the missile data or the target object data based on sensor data from at least one external sensor unit received by the missile, based on data from the at least one missile radar sensor or based on sensor data from at least one other on-board missile sensor unit, other than the at least one missile radar sensor, for collecting the target object data.

8. The method according to claim 1, which further comprises receiving the target object data by the missile at least in part via a wireless connection during a flight of the missile and/or before the missile is launched via a wireless data connection or a wired data connection.

9. The method according to claim 1, wherein an adaptive adjustment of the operating parameters for the modulation of the at least one missile radar sensor furthermore takes place depending on a signal-to-noise ratio present in each case, depending on a detection performance required in each case, depending on an antenna gain and/or depending on a transmitting performance in a direction of the target object.

10. The method according to claim 1, wherein a time-continuous signal with a given chirp duration is set and emitted in an initial flight phase and in that in a subsequent flight phase following identification of the target object in an evaluation window of the at least one missile radar sensor the operating parameters for the modulation of the at least one missile radar sensor are adaptively adjusted.

11. A missile control unit comprising:
a processor; and
a non-transitory computer-readable storage medium having processor-executable instructions stored thereon, which when executed by the processor, cause the processor to perform the method according to claim 1.

12. A missile, comprising:
a missile control unit configured to execute the method according to claim 1; and
at least one on-board missile radar sensor, wherein said at least one on-board missile radar sensor defines a detection field having a center axis oriented obliquely to a longitudinal axis of the missile to a front half-space of the missile and wherein said at least one on-board missile radar sensor is integrated or mounted on a periphery of said missile body, and said missile control unit is coupled in terms of signals and controls with said at least one on-board missile radar sensor for an actuation thereof in accordance with the method according to claim 1.

13. The missile according to claim 12, further comprising at least one further on-board sensor unit for recognizing the target object data which differs from said at least one on-board missile radar sensor and which is coupled in terms of signals and controls with said missile control unit, wherein said further on-board sensor unit is selected from the group consisting of: a radar sensor unit, an optical sensor unit, and an infrared sensor unit.

* * * * *